(12) United States Patent
Capozzella et al.

(10) Patent No.: US 10,056,812 B2
(45) Date of Patent: Aug. 21, 2018

(54) PERMANENT MAGNET ELECTRIC MOTOR AND GENERATOR AND HYBRID MOTOR COMPRISING IT IN A SCOOTER

(71) Applicant: Piaggio & C. S.p.A., Pontedera (PI) (IT)

(72) Inventors: Paolo Capozzella, Pontedera (IT); Roberto Bernardini, Pontedera (IT)

(73) Assignee: PIAGGIO & C. S.P.A., Pontedera (PI) (IT)

( * ) Notice: Subject to any disclaimer, the term of this patent is extended or adjusted under 35 U.S.C. 154(b) by 0 days.

(21) Appl. No.: 15/321,062

(22) PCT Filed: Aug. 3, 2015

(86) PCT No.: PCT/IB2015/055882
§ 371 (c)(1),
(2) Date: Dec. 21, 2016

(87) PCT Pub. No.: WO2016/016874
PCT Pub. Date: Feb. 4, 2016

(65) Prior Publication Data
US 2017/0201165 A1 Jul. 13, 2017

(30) Foreign Application Priority Data
Aug. 1, 2014 (IT) .............................. RM2014A0448

(51) Int. Cl.
*H02K 21/14* (2006.01)
*B60K 6/485* (2007.10)
(Continued)

(52) U.S. Cl.
CPC .............. *H02K 21/14* (2013.01); *B60K 6/24* (2013.01); *B60K 6/26* (2013.01); *B60K 6/485* (2013.01);
(Continued)

(58) Field of Classification Search
CPC ...... H02K 21/14; H02K 1/146; H02K 1/2706; B60K 6/24; B60K 6/26; B60K 6/485;
(Continued)

(56) References Cited

U.S. PATENT DOCUMENTS 6,583,531 B1 * 6/2003 Asano ...................... H02K 1/08
310/156.22
6,664,696 B1 * 12/2003 Pham ..................... H02K 1/146
310/216.106
(Continued)

FOREIGN PATENT DOCUMENTS

EP 1104077 A2 5/2001
EP 1624230 A2 2/2006
(Continued)

*Primary Examiner* — James A Shriver, II
*Assistant Examiner* — Brian L Cassidy
(74) *Attorney, Agent, or Firm* — Volpe and Koenig, P.C.

(57) ABSTRACT

A three-phase permanent magnet electric motor-generator includes a stator having a plurality of teeth, each provided with a respective electric winding implemented by a conducting wire and with a respective heading polar expansion, divided into groups each one corresponding to a phase, by obtaining at the same time a reduced short-circuit current. The distance between adjacent polar expansions is the minimum one so as to allow the passage of a conducting wire. By identifying a first magnetic circuit comprising two adjacent teeth, the respective rotor and stator yokes, the thicknesses of the respective permanent magnets and the corresponding air gap, and a second magnetic circuit having two adjacent teeth, the respective rotor yokes, the respective halves of the faced polar expansions of said adjacent teeth and the distance between such polar expansions, the magnetic reluctances of the first and second circuit have the same order of magnitude.

2 Claims, 3 Drawing Sheets

(51) Int. Cl.
  *B60K 6/26* (2007.10)
  *B60K 6/24* (2007.10)
  *B60L 7/12* (2006.01)
  *H02K 1/14* (2006.01)
  *H02K 3/18* (2006.01)
  *H02K 1/27* (2006.01)
  *H02K 3/28* (2006.01)

(52) U.S. Cl.
  CPC ............... *B60L 7/12* (2013.01); *H02K 1/146* (2013.01); *H02K 1/2706* (2013.01); *H02K 3/18* (2013.01); *H02K 3/28* (2013.01); *B60K 2006/268* (2013.01); *B60L 2220/16* (2013.01); *Y10S 903/905* (2013.01); *Y10S 903/906* (2013.01)

(58) Field of Classification Search
  CPC . B60K 2006/268; B60L 7/12; B60L 2220/16; Y10S 903/905; Y10S 903/906
  USPC ....................................................... 180/65.21
  See application file for complete search history.

(56) References Cited

U.S. PATENT DOCUMENTS

| | | | | |
|---|---|---|---|---|
| 9,369,019 | B1* | 6/2016 | Abe | H02K 3/28 |
| 2001/0028201 | A1* | 10/2001 | Miyashita | H02K 1/276 |
| | | | | 310/156.38 |
| 2002/0047460 | A1* | 4/2002 | Yoneda | B62D 5/043 |
| | | | | 310/216.112 |
| 2004/0124732 | A1* | 7/2004 | Hans | H02K 1/146 |
| | | | | 310/216.091 |
| 2005/0026737 | A1* | 2/2005 | Czysz | F16D 7/027 |
| | | | | 475/273 |
| 2005/0046304 | A1* | 3/2005 | Tamaki | H02K 21/046 |
| | | | | 310/254.1 |
| 2006/0122017 | A1* | 6/2006 | Masuda | B62M 9/04 |
| | | | | 474/144 |
| 2006/0197402 | A1* | 9/2006 | Gomyo | H02K 1/146 |
| | | | | 310/216.008 |
| 2007/0013255 | A1* | 1/2007 | Wakitani | H02K 1/146 |
| | | | | 310/216.018 |
| 2007/0026982 | A1* | 2/2007 | Aoyama | F02B 61/02 |
| | | | | 474/14 |
| 2007/0046127 | A1* | 3/2007 | Kloeppel | H02K 3/18 |
| | | | | 310/180 |
| 2007/0295159 | A1* | 12/2007 | Nishi | F16H 57/04 |
| | | | | 74/606 R |
| 2008/0022981 | A1* | 1/2008 | Keyaki | F01M 13/04 |
| | | | | 123/574 |
| 2008/0072861 | A1* | 3/2008 | Takano | F02N 11/00 |
| | | | | 123/179.25 |
| 2008/0143210 | A1* | 6/2008 | Wang | H02K 1/146 |
| | | | | 310/216.004 |
| 2010/0181862 | A1* | 7/2010 | Krauth | H02K 1/165 |
| | | | | 310/198 |
| 2010/0250105 | A1* | 9/2010 | Nagatsuyu | F02D 41/061 |
| | | | | 701/112 |
| 2011/0176240 | A1* | 7/2011 | Tashiro | G11B 19/2009 |
| | | | | 360/97.11 |
| 2011/0298329 | A1* | 12/2011 | Kinugawa | H02K 1/148 |
| | | | | 310/208 |
| 2011/0304238 | A1* | 12/2011 | Nagai | G11B 19/2009 |
| | | | | 310/216.092 |
| 2012/0200182 | A1* | 8/2012 | Park | H02K 3/28 |
| | | | | 310/71 |
| 2014/0030122 | A1* | 1/2014 | Ozaki | F04D 13/0666 |
| | | | | 417/410.1 |
| 2014/0246939 | A1* | 9/2014 | Murakami | H02K 1/148 |
| | | | | 310/156.05 |
| 2014/0246940 | A1* | 9/2014 | Murakami | H02K 29/12 |
| | | | | 310/156.49 |
| 2015/0069878 | A1* | 3/2015 | Hattori | H02K 1/146 |
| | | | | 310/215 |
| 2015/0149016 | A1* | 5/2015 | Saitoh | B60K 6/485 |
| | | | | 701/22 |
| 2015/0200576 | A1* | 7/2015 | Kinashi | H02K 29/08 |
| | | | | 310/71 |
| 2016/0006301 | A1* | 1/2016 | Matsuoka | H02K 21/16 |
| | | | | 310/216.112 |
| 2016/0036279 | A1* | 2/2016 | Aso | H02K 3/522 |
| | | | | 310/43 |
| 2016/0087498 | A1* | 3/2016 | Matsuoka | H02K 21/16 |
| | | | | 310/156.43 |
| 2016/0105088 | A1* | 4/2016 | Narita | H02K 19/10 |
| | | | | 310/216.091 |
| 2016/0336823 | A1* | 11/2016 | Kikuchi | H02K 1/246 |
| 2016/0336884 | A1* | 11/2016 | Matsuoka | H02P 6/085 |
| 2017/0018985 | A1* | 1/2017 | Suzuki | H02K 3/34 |
| 2017/0237304 | A1* | 8/2017 | Okochi | H02K 1/146 |
| | | | | 310/216.069 |

FOREIGN PATENT DOCUMENTS

| | | |
|---|---|---|
| EP | 1344296 B1 | 7/2008 |
| JP | H03178536 A | 8/1991 |
| JP | 2000103384 A | 4/2000 |
| WO | 00/76054 A1 | 12/2000 |

* cited by examiner

PERMANENT MAGNET ELECTRIC MOTOR AND GENERATOR AND HYBRID MOTOR COMPRISING IT IN A SCOOTER

The present invention relates to an electric motor, of the type with three-phase permanent magnets (brushless), with radial flow, in particular of the type apt to be mounted on the crankshaft of a four-stroke engine to act as motor and generator, thus determining a hybrid motor.

In this configuration, which can be used in an advantageous way aboard a scooter with a four-stroke single-cylinder engine, the rotor is provided with a certain number of permanent magnets and it is pre-arranged to be dragged into rotation directly by the crankshaft when the four-stroke engine is operating, to recharge the vehicle battery.

It is to be noted that this configuration allows recovering a portion of the energy used during breaking, by converting it into electric current.

Upon starting the four-stroke engine, the electric motor acts as starter motor fed by the same battery. Advantageously, a system for automatically switching-off the four-stroke engine can be provided when the vehicle stops, with a system managing automatically the engine re-starting as soon as driving power is requested again.

In this scheme a stator is used having a substantially circular structure with teeth made of ferromagnetic material, thereon electric wires are wound, crossed by electric current: the teeth are divided into groups for each phase, typically a three-phase solution is used.

In the radial flow motor-generator, the selection of the number of teeth and of the type of winding influences the losses inside the electric motor and the amount of short-circuit current, used during the recharging phase, which in turn determines a higher or lower stress in the battery.

On the other hand, in an engine with small sizes, for example with a displacement of 125 or 150 cc., the rooms available for housing the electric machine are limited, whereas, indeed for the type of the used motor, the cost thereof has to be low in order not to affect too much that of the scooter including it.

It is to be noted that, at the performance level, the electric machine has to supply a torque up to 8.0 Nm, with a current of about 80 A. Once given these constructive constraints, the stator configuration has to be optimized to reduce the short-circuit current: a lower short-circuit current would allow diminishing the losses on the electric machine and implementing smaller control electronic devices. During the recharging phase a control period is established and the control electronic devices act during this period: for a period portion by short-circuiting the phases of the electric machine and for the remaining portion by supplying this current to the battery.

The European patent Nr. EP 1,344,296 describes a particular arrangement of the windings in an electric motor wherein a high number of teeth is provided, but with reduced size. In order to obtain this configuration, the winding in each phase groups three teeth connected in series.

However, this configuration results to be extremely complex, as the reduced size of the teeth makes difficult the implementation itself of the windings on each tooth.

The International application Nr. WO 00/76054 A1 describes a stator wherein teeth made of ferromagnetic material are provided whereon no winding is provided. However, this configuration involves a high number of teeth.

The Japanese application Nr. JPH03178536 describes an arrangement of windings in a stator, wherein the teeth are consecutively alternated to belong each one to a different phase, with the windings of each phase arranged in parallel therebetween. However, even this configuration is suitable for stators with high number of teeth.

The technical problem underlying the present invention is to provide an electric motor-generator allowing to overcome the drawbacks mentioned with reference to the known art.

Such problem is solved by an electric motor-generator of the type with permanent magnets with three-phase radial flow, comprising a stator, surrounding a rotor, having a plurality of teeth, each one provided with a respective electric winding implemented by a conducting wire and a respective heading polar expansion, divided into groups corresponding each one to a phase, wherein the windings of each single tooth of each group are connected therebetween in parallel, wherein the distance between adjacent polar expansions is the minimum one so as to allow the passage of a conducting wire and wherein, by identifying a first magnetic circuit comprising two adjacent teeth, the respective rotor and stator yokes, the thicknesses of the respective permanent magnets and the corresponding air gap, and a second magnetic circuit comprising two adjacent teeth, the respective rotor yokes, the respective halves of the faced polar expansions of said adjacent teeth and the distance between such polar expansions, the magnetic reluctances of the first and the second circuit have the same order of magnitude.

The main advantage of the electric motor-generator consists in allowing an easy implementation of the windings in the motor itself by using stator teeth with even important sizes, at the same time by obtaining a reduced short-circuit current producing a smaller fatigue of the battery during the recharge phase.

The present invention will be described hereinafter according to a preferred embodiment thereof, provided by way of example and not for limitative purposes by referring to the enclosed drawings wherein.

Figure 1:
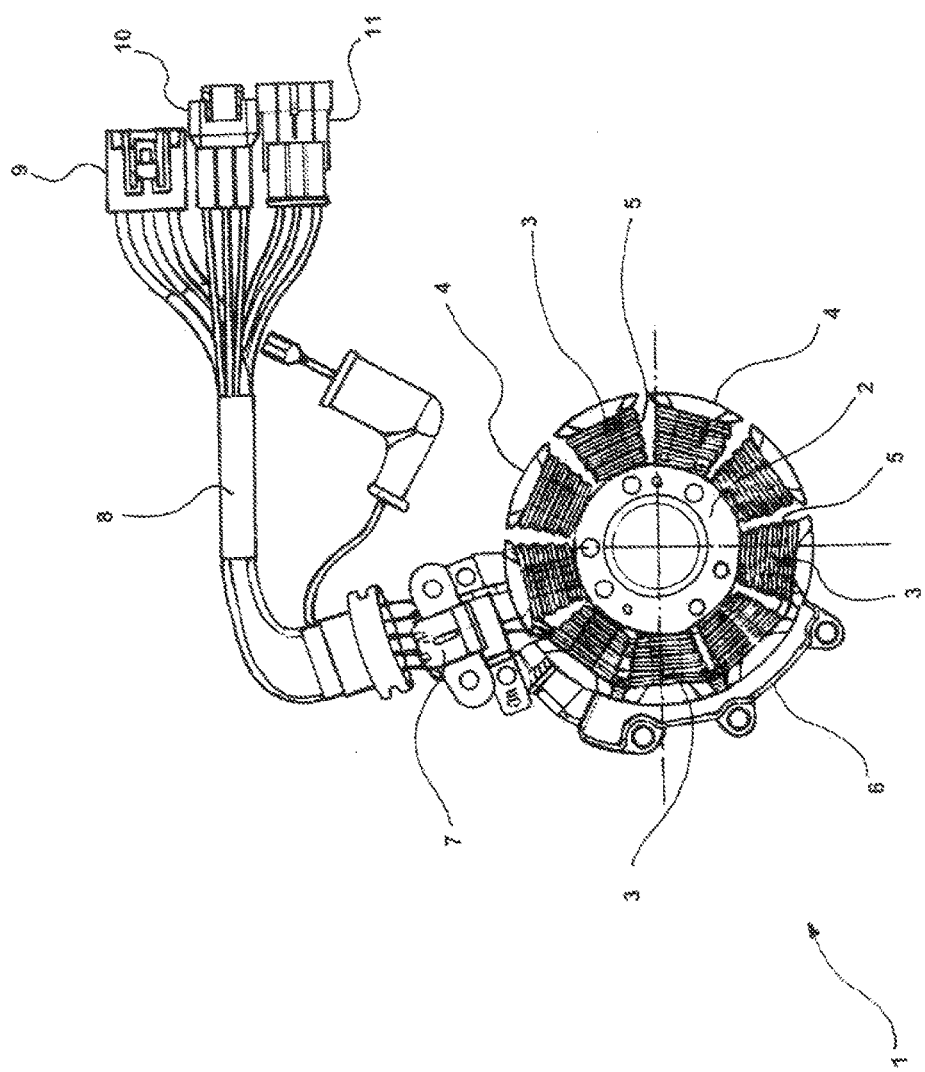
FIG. 1 shows a cross-section of the stator of an electric motor according to the present invention.

By referring to the figures, an electric motor-generator is illustrated in cross-section and it is designated with 1.

It is provided in a hybrid motor (not represented) comprising a single-cylinder four-stroke internal combustion engine, wherein the rotor of the electric motor-generator is fitted directly on the crankshaft of the internal combustion engine.

In particular, the assembly provides a configuration wherein the electric motor-generator is fitted on the crankshaft on one side of the respective engine block of the internal combustion engine opposite to the one wherein the engine is connected to the vehicle transmission organs, in particular a scooter.

The motor-generator is of the type with permanent magnets and has three phases, with a stator, outside the rotor, constituted by nine teeth, divided into groups made up of three teeth for each phase.

This type of electric motor is particularly suitable to be mounted on the axis of the crankshaft of a four-stroke engine, in particular a single-cylinder engine, in order to act both as starter engine and as generator.

The rotor is implemented in an element full of ferromagnetic material, comprising a central core 2 fitted to the crankshaft of an internal combustion engine: the full portion of the core constitutes the rotor yoke.

On the outer surface thereof, the rotor comprises a plurality of (not represented) permanent magnets of the type made of ferromagnetic ceramics, in particular ferrite.

The stator comprises a plurality of teeth 3 extending internally and radially, each one ending outside with an enlarged head 4, also called polar expansion, so as to implement a compartment between tooth and tooth which is filled up with windings 5 of conducting wire made of copper arranged around each tooth.

The teeth 3 have then an outer connecting surface formed by the respective heads 4, also called polar expansions which in section have respective projecting halves 12 and they are separated by a distance 13 therethrough the wires have to cross during the winding phase.

The stator 1 further comprises a crown or yoke 6 and an outer reinforcement portion thereof, which occupies a circular sector of the stator, therefrom the cables of all windings branch through a connecting element 7 outside the stator 1, then connected inside a sheath 8 and connected to a respective plug 9 which will be connected to the battery.

From said reinforcement portion even other cables branch, connected to Hall sensors, generally phase position sensors, placed between said reinforcement portion 6 and the teeth 3 positioned therein.

The sheath 8 includes even said other cables, then connected to respective connectors 10 and 11.

As said previously, the teeth 3 are divided into three groups, each one corresponding to a phase: the teeth of each group are separated by a circular sector of the stator 1, with the width of 120°.

The windings are implemented by a plurality of coils of the same wire made of glazed copper, arranged on several layers on the same tooth.

Figure 2:
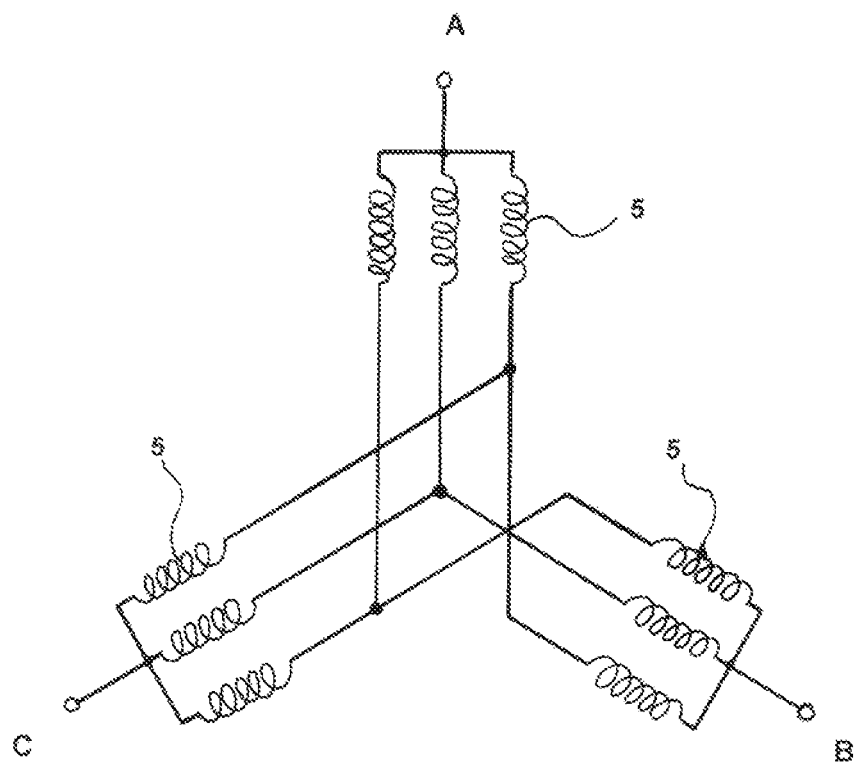
FIG. 2 shows a scheme of a winding applied to the stator of FIG. 1.

By referring to FIG. 2, of each group, designated with A, B, C, only the windings 5 of the stator are represented schematically. It is to be noted that the windings 5 of the same group are not arranged in series therebetween, but they are implemented by distinct wire tracts, connected to the ends in a configuration in parallel.

Therefore, each winding of each tooth belonging to the same group is connected to the windings belonging to the same group in parallel (FIG. 2).

This configuration with nine teeth results then to be particularly advantageous to optimize the engine losses, given a determined design torque requested by the same engine, which determines the weight of the ferromagnetic material and then the sizes of the engine itself.

Generally, this technique to implement the windings allows using teeth with larger sizes than the state of art, by making then easier to perform the windings during the assembly of the engine.

Figure 3:
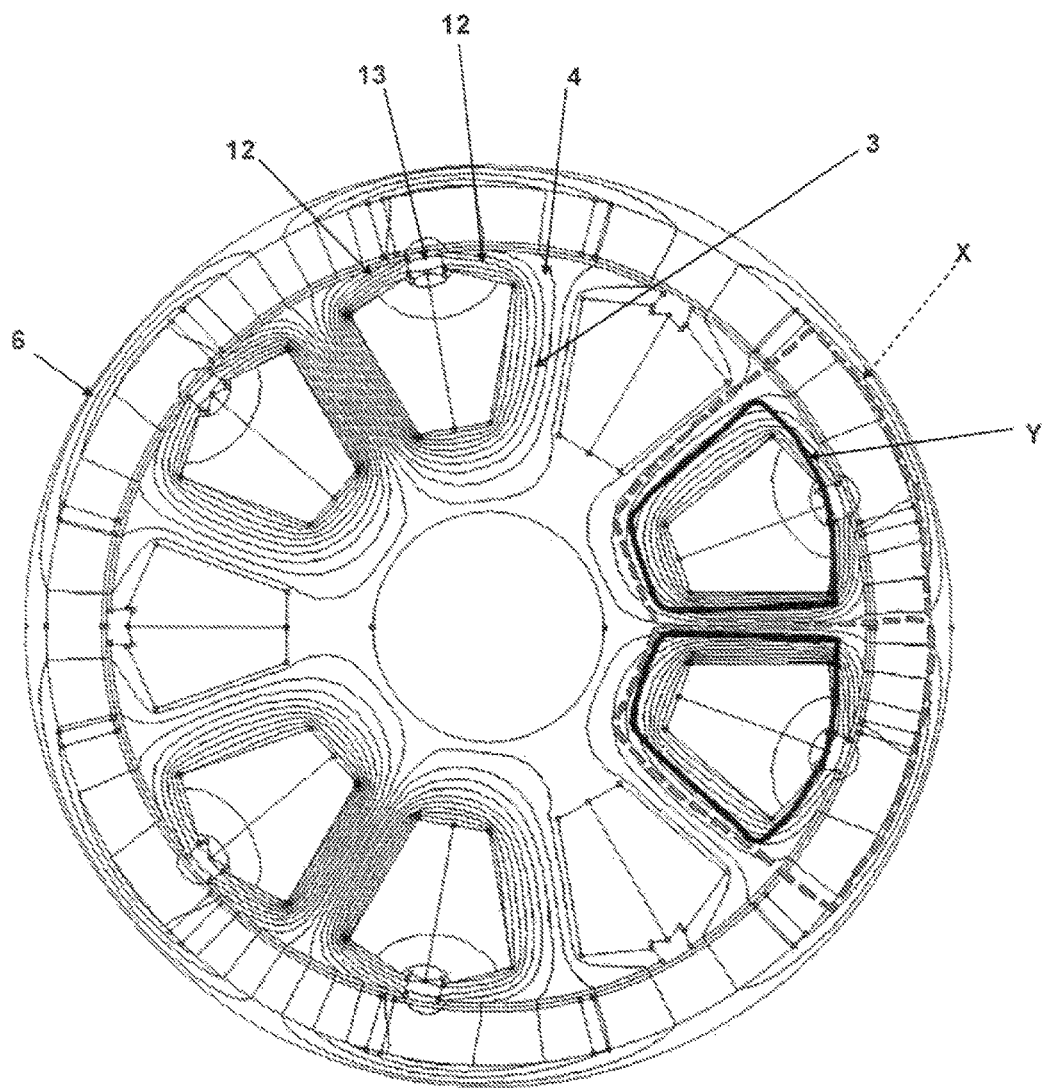
FIG. 3 represents the magnetic circuits in the winding scheme in FIG. 2.

By referring to FIG. 3 the magnetic circuits X, Y are represented, which can be detected for each coil wound on a tooth. A first dotted circuit (FIG. 3) comprises the tooth 3 of the winding 5, the teeth 3 of the adjacent windings, the rotor and stator yokes, the thicknesses of the magnets, the air gap. The magnet has a magnetic permeability practically equal to that of the air; it follows that in this circuit there are the higher magnetic losses in the flow passage on the air gap and on the thickness of the magnets.

The second circuit Y drawn with a solid line, instead, comprises the tooth of the winding, the teeth of the adjacent windings, the rotor yokes, half of the polar expansion and the thickness between the polar expansions. Here, there are the higher magnetic losses in the flow passage on the thickness between the polar expansions: in order to increase the magnetic reluctance, one has to decrease the losses on the magnetic circuits.

The size of the magnets' thickness is relevant with respect to the air gap and however it can be compared to the distance between the polar expansions, as the thickness is useful to avoid that the magnets made of ferrite could demagnetize when in the machine windings the maximum current circulates. It follows that the magnetic reluctance of the other circuit (not dotted, solid line) has the same order of magnitude as the one described previously.

Such magnetic circuits are in parallel therebetween: to increase the magnetic reluctance it is sufficient to decrease the magnetic losses on one of the two circuits.

The first circuit is sized to guarantee the torque performances of the electric machine and then carrying out modifications reducing the magnetic losses and not worsening the performances becomes difficult.

As far as the second circuit is concerned, in order to decrease the magnetic losses it is sufficient to decrease the distance between the polar expansions. The obtainable minimum distance, however, has to be sufficient to allow the wire passage during the phase for winding the coil on the tooth.

With respect to a solution with a higher number of teeth, for example eighteen, the circuits between two stator poles are connected in series and then the thickness between the teeth on the second circuit has a double weight, by involving an increase in the losses on the magnets and a decrease in the equivalent reluctance.

Then, substantially a lower reluctance, that is a higher inductance and then a lower short-circuit electric current, corresponds to a larger size of the tooth, so as to reduce considerably the stress on the battery.

It is to be meant that the herein described solution is only one of the solutions, which is possible to implement according to the same inventive principle.

To the above-described electric motor and related electric winding a person skilled in the art, with the purpose of satisfying additional and contingent needs, could introduce several additional modifications and variants, all however comprised within the protection scope of the present invention, as defined by the enclosed claims.

The invention claimed is:

1. An electric motor-generator (1) of the type with permanent magnets with three-phase radial flow, comprising a substantially circular stator, surrounding a rotor having permanent magnets with a permanent magnet thickness, stator and rotor having respective stator and rotor yokes, having a plurality of stator teeth (3) radially extending towards the rotor, each stator tooth (3) provided with a respective electric winding (5) implemented by a conducting wire and a respective heading polar expansion (4), which in section have respective projecting halves, divided into groups (A, B, C) each one corresponding to a phase, wherein the electric windings (5) of each single stator tooth of each group are connected therebetween in parallel, wherein a distance (13) between adjacent polar expansions is a smallest possible distance which allows said conducting wire to pass therebetween and wherein, identifying first magnetic circuits (X) implemented by two adjacent teeth (3) of said stator teeth, the respective rotor and stator yokes, the thicknesses of the respective permanent magnets and a corresponding air gap therebetween, and second magnetic circuits (Y) comprising two adjacent teeth (3) of said stator teeth, the respective yoke of the rotor (2), the respective halves (12) of faced polar expansions (4) of said adjacent stator teeth (3) and the distance (13) between such adjacent polar expansions (4), the magnetic reluctances of the first and second circuits (X, Y) have the same order of magnitude.

2. The electric motor according to claim 1, wherein said stator teeth of the stator consist of nine teeth, divided into three groups (A, B, C) made up of three stator teeth each.

\* \* \* \* \*